Jan. 8, 1952  J. S. KOBLAS  2,582,136
SNOWPLOW
Filed June 12, 1947  2 SHEETS—SHEET 1

Inventor
John S. Koblas

By *Clarence A. O'Brien and Harvey B. Jackson*
Attorneys

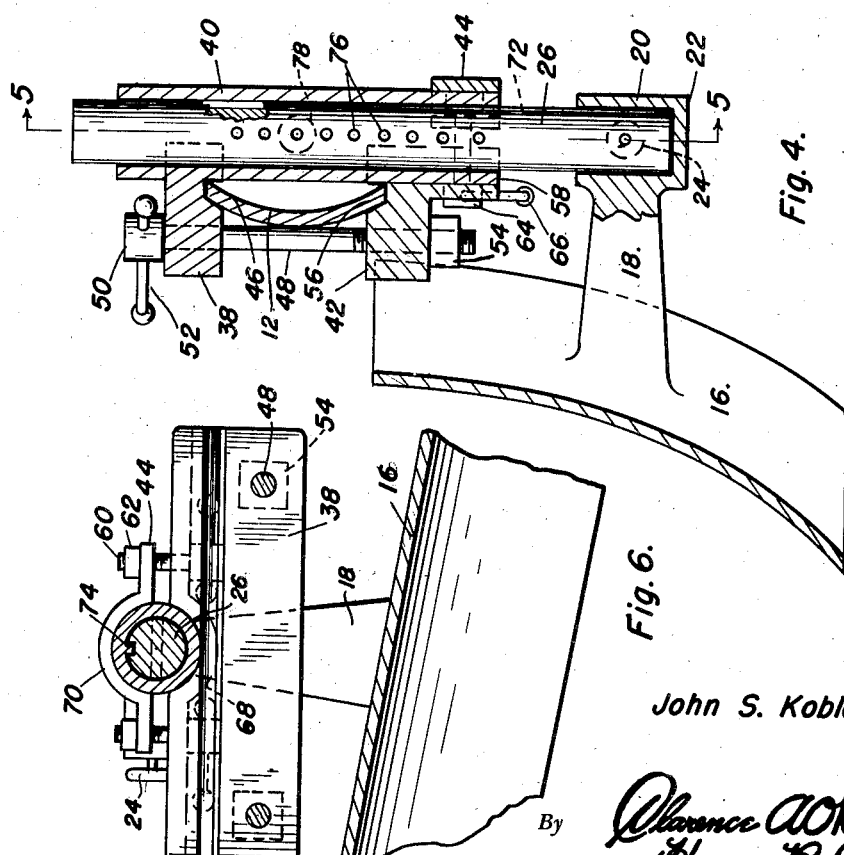

Patented Jan. 8, 1952

2,582,136

UNITED STATES PATENT OFFICE 2,582,136

SNOWPLOW

John S. Koblas, Minneapolis, Minn.

Application June 12, 1947, Serial No. 754,204

2 Claims. (Cl. 37—42)

This invention relates generally to snow plows and more particularly to dual blade snow plows adapted to be secured to the fore part of an automotive vehicle in line with the running wheels thereof, the device including means whereby the plows are made easily demountable and easily adjustable as to height.

A primary object of this invention is to provide means attachable to the front end of an automotive vehicle whereby snow may be cleared from the path of the wheels of the vehicle, such clearance being, of course, desired in order to improve the traction of these wheels.

Another object of this invention is to provide means of this character which will clear paths of only sufficient widths to provide such improved traction, limitation of the width of these tracks or paths lessening the likelihood of greatly decreasing the speed of the vehicle, or causing the same to stall.

Another object of this invention is to provide means which may be very quickly and conveniently secured to the bumper, and which is separable into a number of relatively small parts which may be conveniently stored in the vehicle for emergency use.

Still another object of this invention is to provide snow plow means which may be mounted on a vehicle without the use of wrenches or special tools, and which may be adjusted as to height.

And a last object to be specifically mentioned is to provide a device of this character which is relatively inexpensive and practicable to manufacture and which will give generally efficient and durable service.

With these objects definitely in view, this invention resides in certain novel features of construction, combination and arrangement of parts and portions as will be hereinafter described in the specification, particularly pointed out in the claims, and illustrated in the accompanying drawings which form a material part of this application, and in which:

Figure 4 is a vertical sectional view, taken on the line 4—4 in Figure 2;

Figure 5 is a vertical sectional view, taken on the line 5—5 in Figure 4; and

Figure 6 is a horizontal sectional view, taken on the line 6—6 of Figure 1.

Similar characters of reference designate similar or identical parts and portions throughout the specification and throughout the several views of the drawings.

Figure 1:
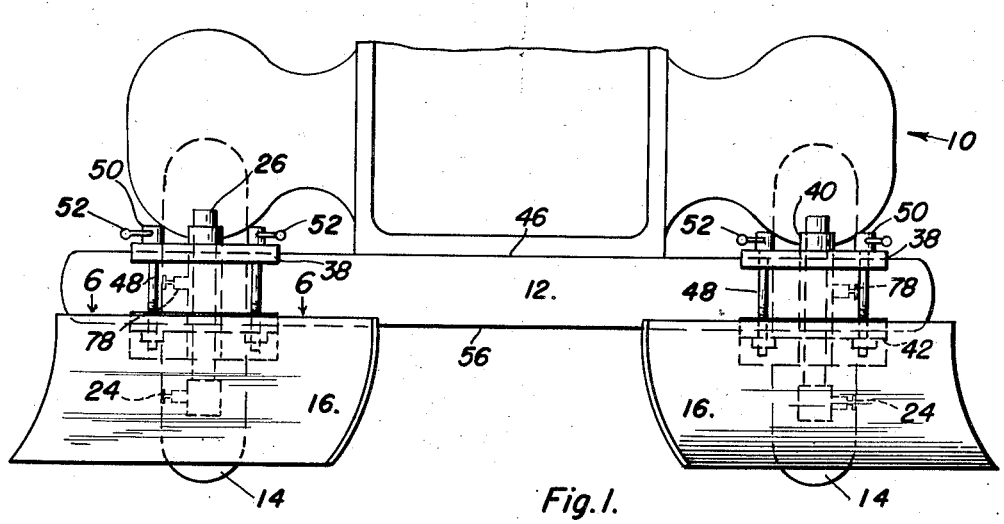
Figure 1 is an elevational view of a front portion of an automotive vehicle including a bumper and with this invention operatively connected on said bumper.
Figure 2:
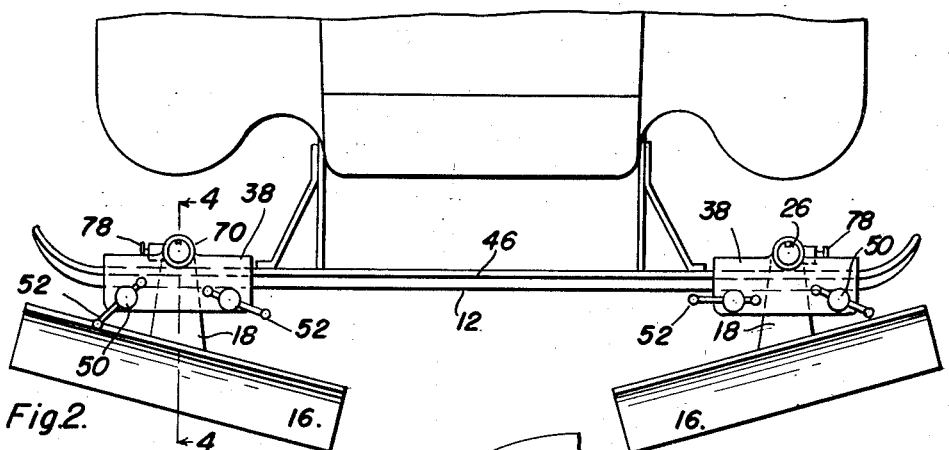
Figure 2 is a top plan view of the structure illustrated in Figure 1.
Figure 3:
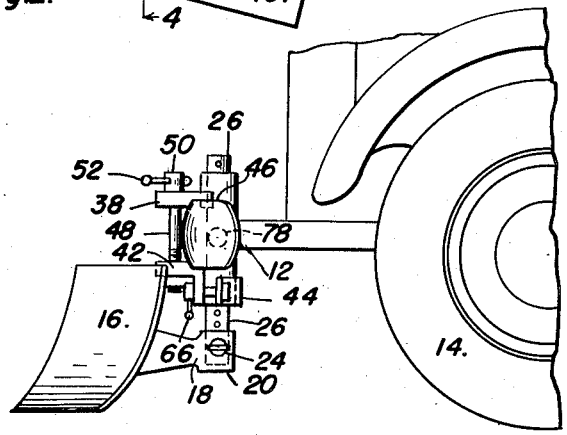
Figure 3 is a side elevational view of this same structure; the view being taken from the left hand side of the vehicle.

Referring now to these drawings in detail, it will be noted that the environment wherewith this invention is adapted to be used includes the fore part of an automotive vehicle, generally indicated by the numeral 10 and including a bumper 12 and front wheels 14.

This invention comprises a snow plow blade 16 which is an elongated plate member, arcuate in cross section, and this blade is provided with mounting means comprising an arm 18 which is rigidly secured to the rear face of the plate and extends substantially horizontally rearwardly to terminate in a socket portion 20. This socket portion is preferably closed at the lower end 22 and a locking member comprising a plunger 24 is incorporated with this socket.

A shaft 26, indicated in the drawings as of circular cross section, is provided adjacent the lower end thereof with a transversely disposed bore 28 to receive the shank portion 30 of the said locking member. If reference be had to Figure 5, it will be noted that a preferred form of locking member is therein illustrated including a cup member 32, within which the spring 34 is compressed between the end of the cup member and a shoulder member 36 secured to the shank 30 of the plunger. The shoulder portion 36 may comprise a washer securable by a cotter pin, not shown, if desired.

A bracket is provided whereby the shaft 26 may be adjustably secured to the bumper 12 and this bracket comprises three main portions which will be described as the top plate member 38 to which is integrally secured a substantially vertical bearing member or tube 40, a lower plate member 42, and a rear bearing plate 44, and these parts will now be described in greater detail.

The top plate member 38 may be of simple rectangular form and the lower surface thereof is provided with a slot to receive the upper end portion 46 of the bumper, and this upper plate, as well as the lower plate 42, is apertured to receive a clamping bolt 48. The clamping bolt is provided with an enlarged head 50 with a knob-ended handle 52 slidably mounted therein, while the lower end of the bolt is screw threaded and a nut 54 is provided to abut the lower face of the lower plate member 42, so that turning of the bolt by means of the handle 52 will be effective in clamping these plates firmly upon the upper edge 46 and the lower edge 56 of the bumper 12, while turning the bolt 48 in the opposite direction will, of course, loosen the bracket from the bumper.

The lower plate member 42 is provided with a slot to receive the said lower edge 56 of the bumper, and an apertured depending flange portion 58 is provided to receive and support the clamping bolts 60. These clamping bolts 60 are provided with nuts 62 which abut the rear surface of the rear plate 44 and the forward end of each of these bolts is provided with an enlarged head 64 in which is slidably mounted a knob-ended handle 66, whereby the bolts may be turned to tighten the tube 40 between the rear plate 44 and the said lower plate 42. It should be noted in this connection that the said members 42 and 44 are each formed with registering arcuate bearing portions 68 and 70, as best indicated in Figure 6, to receive a bearing forming tube 40.

The shaft 26 is provided with a longitudinally disposed slot, indicated by the dash lines 72 in Figure 4, this slot functioning as a keyway for the key 74 integrally secured to the tube 40. This slot and keyway are effective in preventing rotational movement of the shaft 26 within the tube 40, thus preserving correct predetermined positioning of the blade 16 with reference to the bumper. In order to make the said blade adjustable as to height a plurality of apertures are provided in spaced relation in the intermediate portion of the shaft 26, as indicated at 76, and a plunger 78 which may be similar to the plunger 24 is mounted within a cup being secured to the tube 40 and apertured to receive the shank portion 82 of said plunger, which is spring biased as indicated at 84 to selectively engage the apertures 76.

The operation of this invention will be clearly understood from the foregoing description of the mechanical details thereof, taken in connection with the above recitation of the objects sought to be achieved by this invention, but in recapitulation it may be noted that in mounting the device on a bumper, the first step will ordinarily be to attach the lower end of the shaft 26 in the socket 20, and the attachment of the bracket to the bumper by inserting the plates 38 and 42 on the upper and lower edges of the bumper and tightening the bolt 48 by means of the handle 52. The rear plate 44 will also be secured to the lower plate 42 but the bolts 60 need not be tightened until the shaft 26 is inserted into the tube 40. However, an alternative method of mounting this device upon an automotive vehicle, and the method ordinarily used when the device is being mounted on a vehicle on the road or in an emergency, comprises the securement of the bracket in place on the bumper with the shaft 26 loosely mounted therein, whereupon the blade is secured to the lower end of the shaft. The two methods of securing this invention being here recited in order to draw attention to the flexibility and versatility of this invention. In either case, the adjustment of the shaft 26 vertically is accomplished by manipulation of the plunger 78.

Though there has been shown a particular embodiment of this invention, this application is not limited to this particular embodiment, but it is desired to include in the scope of this invention, construction, combination and arrangement of parts and portions substantially as set forth in the appended claims.

What is claimed as new and desired to be secured by Letters Patent is:

1. Means for attachment of a snow plow blade to an automobile bumper, comprising a blade-carrying arm, a substantially vertical shaft removably secured to said arm, and an attaching bracket for said shaft comprising a vertical bearing having a spring biased plunger mounted transversely thereon, said shaft having a plurality of vertically spaced apertures for selectively receiving said plunger, said bearing comprising a sleeve, a bumper-engaging top plate secured to said sleeve, an opposing bumper-engaging lower plate, threaded elements mounted on said plates to move said plates toward and away from each other, a rear plate, and means to clamp the vertical sleeve bearing between the rear plate and the lower plate.

2. Means according to claim 1 and wherein said arm has a socket receiving the lower end of said shaft, and means for releasably securing said lower end in said socket.

JOHN S. KOBLAS.

REFERENCES CITED

The following references are of record in the file of this patent:

UNITED STATES PATENTS

| Number | Name | Date |
| --- | --- | --- |
| 491,621 | Washburn | Feb. 14, 1893 |
| 1,719,886 | Homan | July 9, 1929 |
| 2,141,558 | Richter | Dec. 27, 1938 |
| 2,191,323 | Richter | Feb. 20, 1940 |
| 2,234,645 | Hetzelt | Mar. 11, 1941 |
| 2,276,265 | Sturtz | Mar. 10, 1942 |
| 2,430,221 | Frink et al. | Nov. 4, 1947 |